(12) United States Patent
Pedersen

(10) Patent No.: US 6,568,644 B2
(45) Date of Patent: May 27, 2003

(54) CLAMP FOR A CROSS BAR

(75) Inventor: Magnus E. Pedersen, Alingsas (SE)

(73) Assignee: JAC Products Inc., Saline, MI (US)

( * ) Notice: Subject to any disclaimer, the term of this patent is extended or adjusted under 35 U.S.C. 154(b) by 0 days.

(21) Appl. No.: 09/865,237

(22) Filed: May 25, 2001

(65) Prior Publication Data

US 2002/0174525 A1 Nov. 28, 2002

(51) Int. Cl.[7] ............................................. B60R 9/04
(52) U.S. Cl. ..................... 248/229.13; 248/316.5; 224/309; 224/315; 224/319
(58) Field of Search .................. 248/229.13, 229.23, 248/231.51, 316.5; 224/309, 315, 319, 321, 326, 329, 331, 448, 451, 545

(56) References Cited

U.S. PATENT DOCUMENTS

| | | | |
|---|---|---|---|
| 320,995 A | | 6/1885 | Atkinson |
| 1,004,722 A | | 10/1911 | Baldwin |
| 1,444,004 A | | 2/1923 | Novick |
| 1,468,823 A | | 9/1923 | Massuger et al. |
| 1,983,670 A | | 12/1934 | Knight |
| 2,455,141 A | | 11/1948 | Runge |
| 2,483,012 A | * | 9/1949 | Koon .................... 248/229.15 |
| 2,776,495 A | | 1/1957 | Dickey |
| 2,995,332 A | * | 8/1961 | Davis ........................ 24/134 R |
| 3,601,295 A | | 8/1971 | Lowe |
| 4,301,982 A | * | 11/1981 | Tiemann .................. 244/17.11 |
| 4,445,657 A | * | 5/1984 | Breckenridge ............... 248/73 |
| 4,736,878 A | | 4/1988 | Rasor |
| 4,886,237 A | * | 12/1989 | Dennis .................. 248/289.11 |
| 5,114,060 A | | 5/1992 | Boyer |
| 5,400,900 A | * | 3/1995 | Myers et al. ............. 190/13 R |
| 5,456,396 A | | 10/1995 | Allen |
| 5,556,221 A | * | 9/1996 | Brunner ...................... 224/321 |
| 5,730,343 A | * | 3/1998 | Settelmayer ................ 224/321 |
| 5,769,292 A | | 6/1998 | Cucheran et al. |
| 5,779,119 A | * | 7/1998 | Talbot et al. ............... 224/324 |
| 6,439,526 B1 | * | 8/2002 | London ...................... 206/285 |
| 2001/0048010 A1 | * | 12/2001 | Aki ............................ 224/325 |
| 2002/0079341 A1 | * | 6/2002 | Karlsson .................... 224/319 |
| 2002/0125282 A1 | * | 9/2002 | Laverack et al. ........... 224/319 |

FOREIGN PATENT DOCUMENTS

| | | |
|---|---|---|
| DE | 30 08 984 A1 | 2/1980 |
| DE | 88 11 874 | 9/1988 |
| DE | 93 10 790 0 | 7/1993 |

* cited by examiner

Primary Examiner—Kimberly Wood
Assistant Examiner—Deborah M. Brann
(74) Attorney, Agent, or Firm—Harness Dickey & Pierce P.L.C.

(57) ABSTRACT

A clamp for use with a cross bar of an existing vehicle article carrier to allow accessory vehicle article carrier components to be secured to the cross bar. The clamp includes a base portion and a clamp element hingedly coupled to the base portion. A locking assembly allows the clamp element to be secured to the base portion without any external tools. The locking assembly includes an over-center locking lever which can be pretightened before being moved from an unlatched into a latched position to thus allow a pretightening force to be applied to the clamp element. The clamp element also includes a C-shaped channel for receiving a tap plate or other similar component associated with an accessory article carrier component.

14 Claims, 4 Drawing Sheets

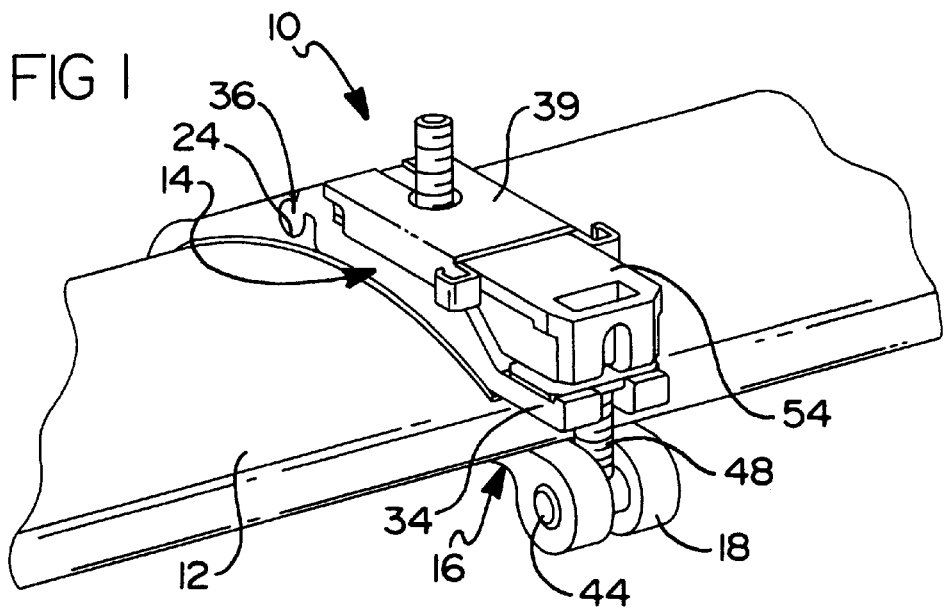
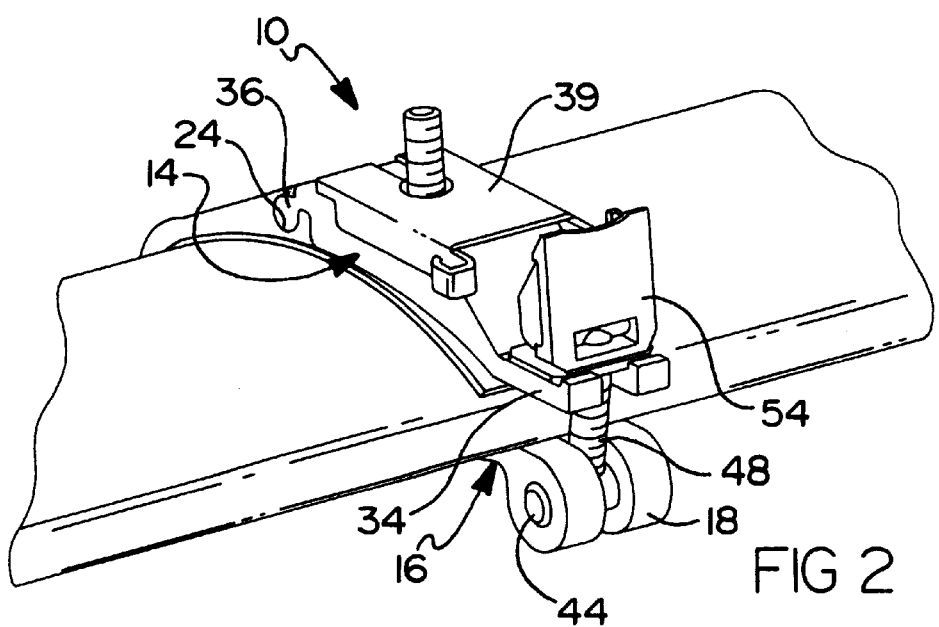

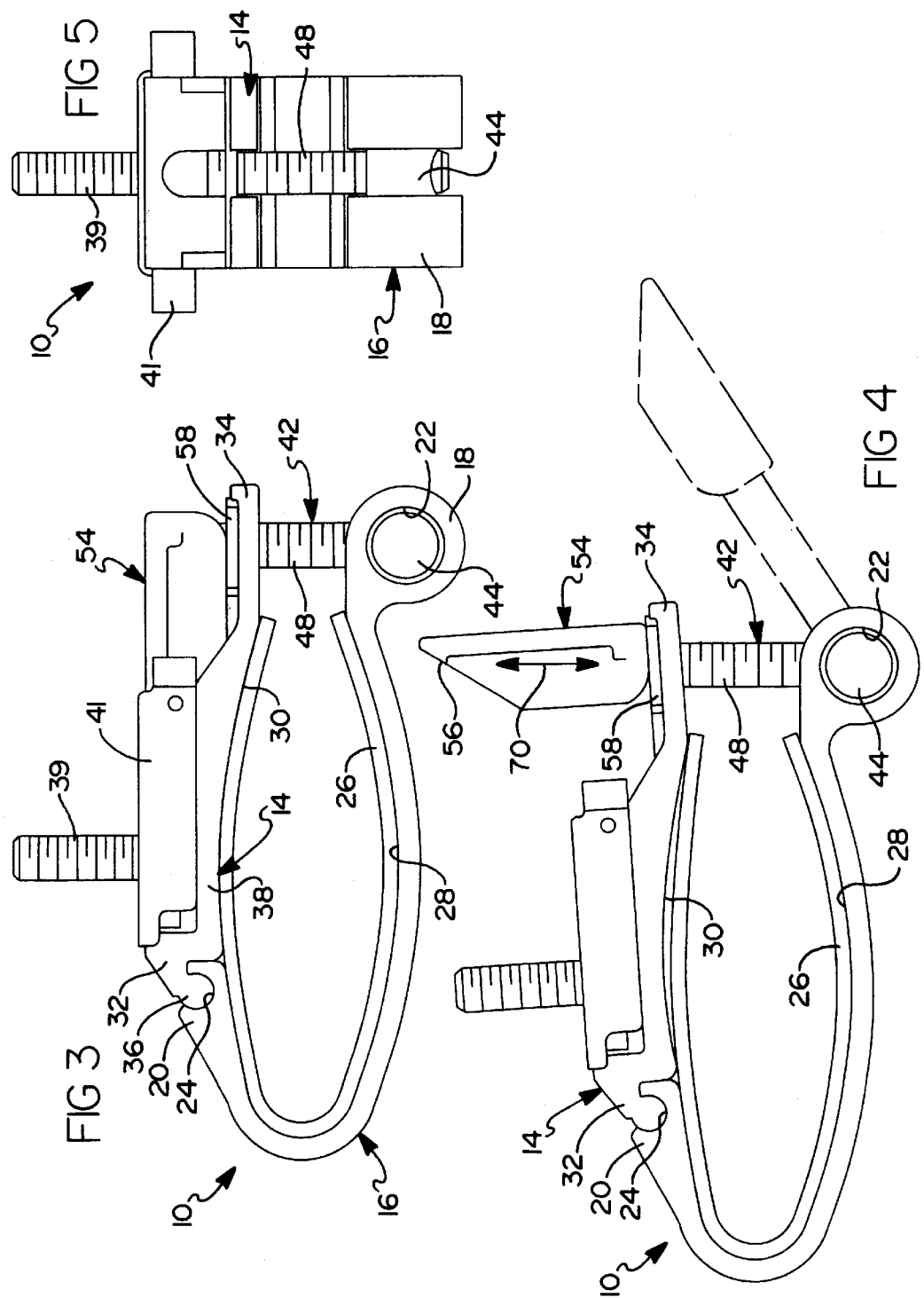

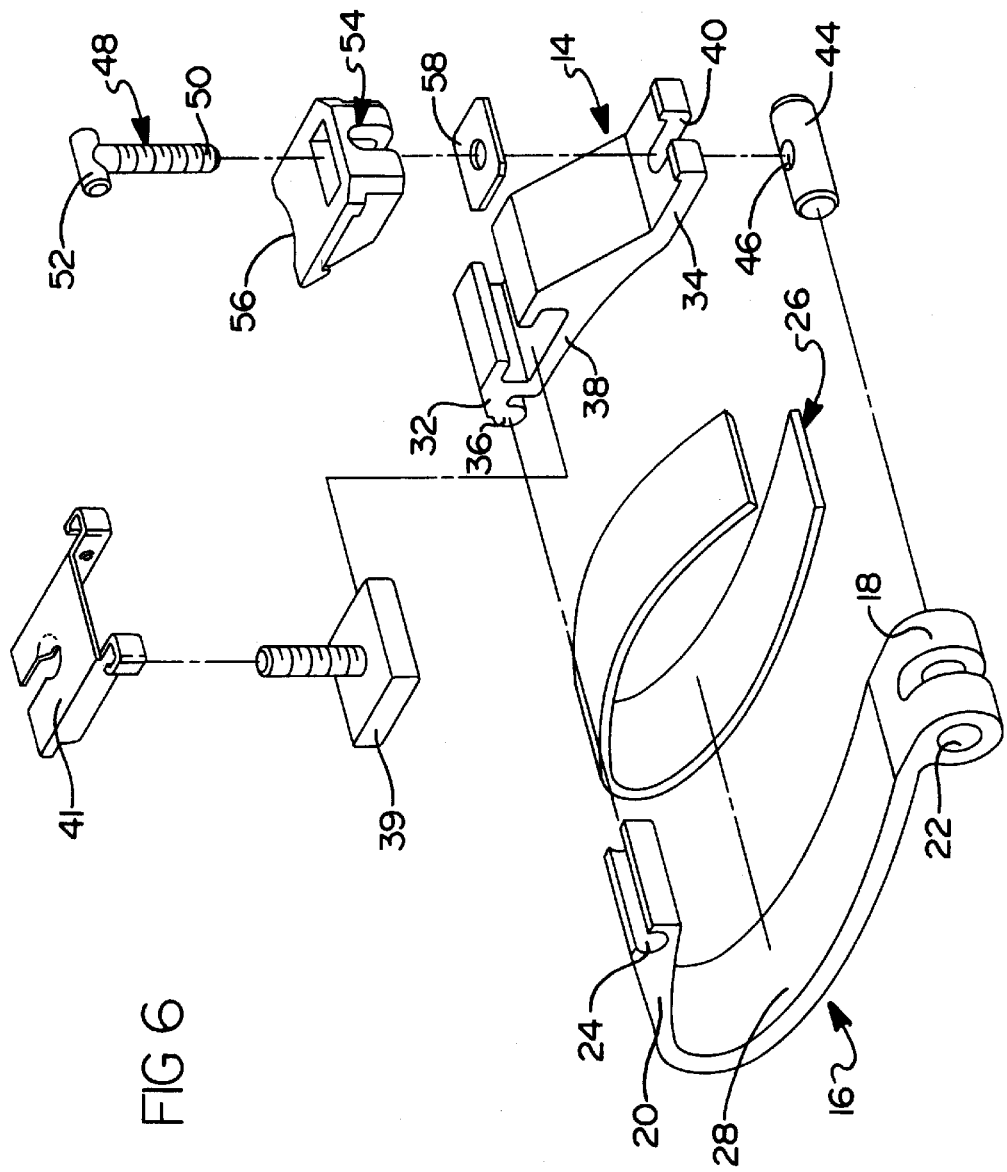

CLAMP FOR A CROSS BAR

FIELD OF THE INVENTION

The present invention relates to clamps, and more particularly to a clamp for use with a cross bar of a vehicle article carrier to provide a means for article carrier accessories such as bicycle racks to be secured to a cross bar of an existing vehicle article carrier.

BACKGROUND OF THE INVENTION

Vehicle article carriers are used in a wide variety of applications to allow luggage and other articles to be transported above an outer body surface of a vehicle. Typically, such vehicle article carriers include a pair of slats or support rails disposed parallel to one another along a major longitudinal axis of the vehicle. One or more cross bars may be fixedly or movably supported on the side rails or slats. Articles can be secured directly to the cross bars via bunge cords, straps or other like components.

When using specific accessory attachments such as a bicycle supporting rack, however, it is not always easy to secure the accessory component to the cross bar (or cross bars) without requiring some disassembly of the existing vehicle article carrier or the use of complex and costly attachment hardware. It would therefore be highly desirable to provide some form of clamp assembly which can be used to easily secure a variety of accessory attachments to a cross bar of an existing vehicle article carrier without requiring disassembly of any component of the vehicle article carrier. It would further be highly desirable to provide such a clamp that can be quickly and easily removed from the cross bar when it is not needed. Still further, it would be highly desirable to provide such a clamp that does not significantly detract from the aesthetic appeal of the existing vehicle article carrier.

SUMMARY OF THE INVENTION

The present invention relates to a clamp which is specifically adapted to engage a cross bar of an existing vehicle article carrier to allow accessory article carrier components or attachments to be secured to and supported on the cross bar. The clamp includes a base portion having a coupling portion and a hinge portion. A clamp element having a first end and a second end is pivotally secured at the first end to the hinge portion of the base portion. A locking assembly is pivotally secured to the coupling portion.

When the clamp is to be attached to a cross bar, the locking assembly is pivoted away from the clamp element and the clamp element is pivoted into an open position to allow the base portion and the clamp element to be slid over the cross bar. The locking assembly is then rotated into a locked position where it engages with the second end of the clamp element. An over-center locking lever carried by the locking assembly is pivoted from an unlatched position into a latched position relative to the clamp element, thus clamping the base portion and clamp element over the cross bar.

The clamp element of the present invention includes an accessory attachment portion which in one preferred embodiment forms a C-shaped channel to which accessory article carrier components can be attached once the clamp is secured to the cross bar. Thus, other rails or tie-down elements can be secured to the clamp and thus supported from the existing cross bar to which the clamp is secured.

In the preferred embodiments the locking assembly includes a T-shaped stud having a threaded portion. The threaded portion is engaged with a threaded aperture of a barrel member which is disposed within the coupling portion of the base portion. The over-center locking lever is secured to a head portion of the T-shaped stud and can be rotated to cause the stud to threadably advance within the threaded aperture of the barrel member. This allows the over-center locking lever to pretighten the clamp element to the base portion prior to urging the over-center locking lever from its unlatched into its latched position.

In the preferred embodiments a resilient pad or other like element is secured to an inner surface of the base portion and has a length sufficient to extend along an interior surface of the clamp element. The resilient pad thus substantially circumscribes the cross bar when the clamp is secured to the cross bar.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a perspective view of the clamp attached to a portion of a cross bar of a vehicle article carrier;

FIG. 2 is a perspective view of the clamp in an open position able to be removed from the cross bar;

FIG. 3 is a side view of just the clamp in its locked position;

FIG. 4 is a side view of the clamp with the over-center locking lever in its open position;

FIG. 5 is an end view of the clamp taken in accordance with directional arrow 5 in FIG. 3;

FIG. 6 is an exploded perspective view of the various components of the clamp;

DETAILED DESCRIPTION OF THE PREFERRED EMBODIMENTS

Figure 7:
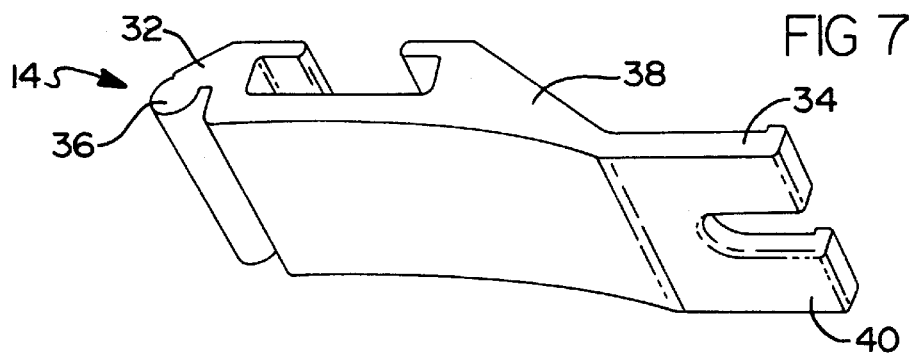
FIG. 7 is a perspective view of just the clamp element.
Figure 8:
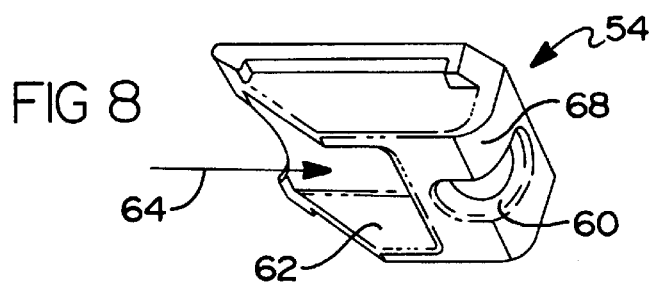
FIG. 8 is a perspective view of the over-center locking lever.
Figure 9:
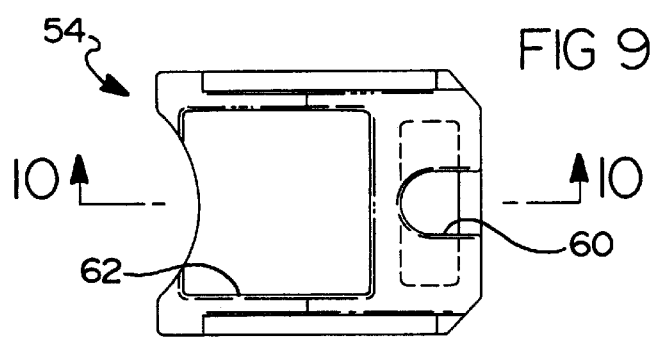
FIG. 9 is a plan view of the bottom surface of the over-center locking lever of FIG. 8.

The following description of the preferred embodiment(s) is merely exemplary in nature and is in no way intended to limit the invention, its application, or uses.

Referring to FIGS. 1 and 2, there is shown a clamp 10 secured to a portion of an existing cross bar 12 of a vehicle article carrier. The clamp 10 is used to support accessory article carrier components such as bicycle carrier rails to the cross bar 12. In this regard it will be appreciated that in many, if not most, applications, a pair of the clamps 10 will be used on each cross bar 12 and spaced apart as needed to accommodate the accessory article carrier component.

With reference to FIGS. 3–6, the clamp 10 includes a clamp element 14 and a base portion 16. With specific reference to FIG. 3, the base portion 16 includes a coupling portion 18 and a hinge portion 20. The coupling portion 18 forms an enlarged yoke-type component (FIG. 5) having a cylindrical bore 22. The hinge portion 20 forms a semi-cylindrical slot 24. A resilient member such as a pad 26 is preferably secured to an inner surface 28 of the base portion 16. The resilient member 26 preferably has a length sufficient to extend underneath an inner surface 30 of the clamp element 14. The resilient member 26 thus substantially circumscribes the cross bar 12 when the clamp 10 is secured to the cross bar. This serves to protect the cross bar 12 from scratches and to further help eliminate any possibility of slippage of the clamp 10 on the cross bar when the clamp is locked onto the cross bar.

The clamp element 14 also includes a first end 32 and a second end 34. The first end 32 includes a cylindrical edge portion 36 which fits within slot 24 and allows the clamp element 14 to rotate about the hinge portion 20. The clamp element 14 further includes an accessory attachment portion 38 (best seen in FIGS. 6 and 7) which in one preferred form comprises a C-shaped channel for allowing a conventional tap plate 39 or other similar component to be secured thereto. The tap plate 39 or like component is then used to interface with the accessory article carrier component to allow the accessory article carrier component to be secured to the clamp 10. If a tap plate is incorporated, then a retaining clip 41 can also be used to hold the tap plate 39 to the clamp element 14. However, it will be appreciated that the retaining clip 41 is optional, even though it is illustrated as a part of the clamp 10.

With further reference to FIGS. 2, 3 and 6, the clamp element 14 includes a notch 40 (FIG. 6) which can be engaged with a locking assembly 42 to allow the clamp element to be held in a clamped position relative to the base portion 16. The locking assembly 42 generally comprises a barrel member 44 having a threaded aperture 46. A T-shaped stud 48 has a lower threaded end 50 which engages with the threaded aperture 46 of the barrel member 44. The T-shaped stud 48 further includes a head portion 52 which engages with an over-center locking lever 54. The locking lever 54 can be urged between the latched position shown in FIG. 3 and the unlatched position shown in FIG. 4 by lifting or pushing an edge 56 thereof in the desired direction. Preferably a lockwasher 58 or other like biasing element is used to further provide a tight latching action when the locking lever 54 is moved into its latched position.

Figure 10:
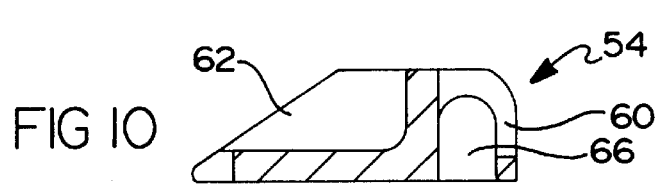
FIG. 10 is a cross sectional side view of the locking lever of FIG. 8 taken in accordance with section line 10—10 in FIG. 9.

Referring to FIGS. 6 and 8–10, the over-center locking lever 54 is shown in greater detail. The locking lever 54 includes a cutout 60 which is in communication with a slot 62. The T-shaped stud 48 is assembled to the locking lever 54 by inserting the threaded portion 50 of the stud 48 into the slot 62, in accordance with directional arrow 64 in FIG. 8, and through cutout 60. The head portion 52 of the stud 48 rests within a pocket 66 (FIG. 10). The locking lever 54 is therefore able to move rotationally about the head portion 52 through an arc defined by the cutout 60. A camming surface 68 and the location of the pocket 66 allows an over-center locking action to be effected when the locking lever 54 is in the latched position of FIG. 3. The locking lever 54 can also be rotated to threadably advance the threaded portion 50 within threaded aperture 46 of the barrel member 44, thus allowing a pretightening force to be applied prior to urging the locking lever 54 into its latched position.

In operation, the user first rotates the locking assembly 42 to the position shown in phantom in FIG. 4 and then orientates the clamp element 14 and the base portion 16 of the clamp 10 over the cross bar 12. The clamp element 14 is then moved into a locked position resting against an outer surface of the cross bar 12. The locking assembly 42 is then rotated such that the threaded portion 50 of the T-shaped stud 48 engages with the notch 40. The locking lever 54 is then rotated about longitudinal axis 70 shown in FIG. 4 to apply a pretightening force by drawing the clamp element 14 and base portion 16 into contact with the cross bar 12. The over-center locking lever 54 is then rotated from its unlatched position (FIG. 4) to its latched position (FIG. 3). The accessory attachment component can then be secured to the tap plate 39 or the C-shaped channel of the accessory attachment portion 38.

The clamp element 14 and base portion 16 may be formed from a variety of materials but are preferably formed from aluminum or another suitably high strength material. The resilient member 26 may be formed from rubber or any other suitably resilient material. A clamp 10 can be quickly and easily removed without any external tools from the cross bar 12 when not needed and does not detract from the aesthetic appeal of the cross bar or otherwise significantly interfere with use of the cross bar even when left in place attached to the cross bar.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An adjustable clamp for use with a cross bar of a vehicle article carrier to enable accessory article carrier components to be secured to said cross bar, said clamp comprising:

a base portion having a coupling portion and a hinge portion; a clamp element having a first end and a second end, said first end being hingedly coupled to said hinge portion;

said clamp element having an accessory attachment portion formed between said first end and said second end, said accessory attachment portion adapted to couple to an external article carrier component;

a locking assembly secured to said coupling portion of said base portion, said locking assembly including an over-center locking lever, the locking assembly adapted to be rotated between a non-locking position and a locking position about said coupling portion of said bass portion, said locking lever further being rotatable between an unlatched position and a latched position;

said clamp element being movable pivotally about said first end away from said base portion into an open position to allow said clamp to be placed over said cross bar, and also into a clamping position disposed against a surface of said cross bar, wherein said second end can be engaged by said locking assembly; and once said locking assembly is in said locking position engaged with said second end of said clamp element, said over-center locking lever is movable from said unlatched position to said latched position to clampingly secure said second end of said clamp element tightly and said base portion over said cross bar.

2. The clamp of claim 1, wherein said coupling portion comprises a cylindrical bore; and wherein said locking assembly comprises a barrel member having a threaded aperture and being disposed within said cylindrical bore.

3. The clamp of claim 2, wherein said locking assembly further comprises a T-shaped locking stud having a threaded end, said threaded end being secured to said threaded aperture of said barrel member.

4. The clamp of claim 3, wherein said over-center locking lever is coupled to a T-shaped head portion of said T-shaped locking stud for rotating said T-shaped locking stud.

5. The clamp of claim 4, wherein said second end of said clamp element includes a notch for engaging with said T-shaped locking stud, said over-center locking lever resting over said second end when said locking assembly is rotated into said locking position; and
 wherein said over-center locking lever can be used to pre-tighten said clamp element against said cross bar prior to said over-center locking lever being moved into said latched position.

6. The clamp of claim 1, further comprising a resilient pad secured to an inside surface of said base portion.

7. The clamp of claim 1, further comprising a resilient, elongated pad disposed along an interior surface of said base portion and being sufficient in length to extend along an inside surface of said clamp element, to thereby substantially circumscribe an exterior surface of said cross bar and protect said exterior surface when said clamp is clamped to said cross bar.

8. An adjustable clamp for use with a cross bar of a vehicle article carrier to enable accessory article carrier components to be secured to said cross bar, said clamp comprising;
 a base portion having a coupling portion and a hinge portion;
 a clamp element having a first end and a second end, said first end being hingedly coupled to said hinge portion;
 said clamp element having an accessory attachment portion formed between said first end and said second end, said accessory attachment portion adapted to couple to an external article carrier component;
 a locking assembly including:
  a stud assembly pivotally secured to said coupling portion of said base portion, said stud assembly being movable rotationally between an unlocked position and a locked position; and
  an over-center locking lever adapted to be rotated between an unlatched position and a latched position;
 said clamp element being movable pivotally about said first end away from said base portion into an open position to allow said clamp to be placed over said cross bar, and also into a clamping position disposed against a surface of said cross bar, wherein said second end thereof can be engaged a portion of said over-center locking lever; and
 once said looking assembly is in said locked position engaged with said second end of said clamp element, said over-center locking lever can be moved from said unlatched position to said latched position to clampingly secure said second end of said clamp element tightly aver said cross bar.

9. The clamp of claim 8, wherein said stud assembly comprises a T-shaped stud having a threaded end portion, and an independent barrel member having a threaded aperture for engaging with said threaded end portion of said T-shaped stud;
 wherein said coupling portion includes a cylindrical bore; and
 wherein said barrel member is disposed within said cylindrical bore.

10. The clamp of claim 8, further comprising a resilient member secured to an inner surface of said base portion.

11. The clamp of claim 8, further comprising a resilient member secured to an inner surface of said base portion and having a length sufficient to substantially circumscribe said cross bar when said clamp is clamped to said cross bar.

12. The clamp of claim 8, wherein said first end of said clamp element includes a shoulder portion for limiting rotational movement of said clamp element.

13. An adjustable clamp for use with a cross bar of a vehicle article carrier to enable accessory article carrier components to be secured to said cross bar, said clamp comprising:
 a base portion having a coupling portion and a hinge portion;
 a clamp element having a first end and a second end, said first end being hingedly coupled to said hinge portion, and an accessory attachment portion formed in between said first and second ends;
 a locking assembly including:
  a stud assembly pivotally secured to said coupling portion of said base portion, said stud assembly being movable rotationally between an unlocked position and a locked position; and
  said stud assembly including a barrel member having a threaded aperture and a T-shaped stud having a threaded end portion engageable with said threaded aperture;
 an over-center locking lever coupled to said T-shaped stud and adapted to be rotated between an unlatched position and a latched position, and further operable to be rotated so as to pretighten said over-center locking lever against said second end of said clamp element;
 said clamp element being movable pivotally about said first end away from said base portion into an open position to allow said clamp to be placed over said cross bar, and also into a clamping position disposed against a surface of said cross bar, wherein said second end thereof can be engaged a portion of said over-center locking lever; and
 once said locking assembly is in said locked position engaged with said second end of said clamp element, said over-center locking lever can be moved from said unlatched position to said latched position to clampingly secure said second end of said clamp element tightly over said cross bar.

14. The clamp of claim 13, further comprising a resilient pad secured to an inner surface of said base portion.

* * * * *